(12) United States Patent  (10) Patent No.: US 8,811,132 B2
Lee  (45) Date of Patent: Aug. 19, 2014

(54) METHOD FOR CALIBRATING A TRACKING ERROR SIGNAL OF AN OPTICAL DISK DRIVE

(75) Inventor: Chi Min Lee, Hsinchu County (TW)

(73) Assignee: Mediatek Inc., Hsin-Chu (TW)

( * ) Notice: Subject to any disclaimer, the term of this patent is extended or adjusted under 35 U.S.C. 154(b) by 595 days.

(21) Appl. No.: 11/860,557

(22) Filed: Sep. 25, 2007

(65) Prior Publication Data

US 2008/0094975 A1    Apr. 24, 2008

Related U.S. Application Data

(60) Provisional application No. 60/862,617, filed on Oct. 24, 2006.

(51) Int. Cl.
| G11B 7/00 | (2006.01) |
| G11B 7/09 | (2006.01) |
| G11B 7/095 | (2006.01) |

(52) U.S. Cl.
CPC .............. *G11B 7/0901* (2013.01); *G11B 7/094* (2013.01); *G11B 7/0945* (2013.01); *G11B 7/0953* (2013.01)
USPC ..................................................... 369/44.28

(58) Field of Classification Search
None
See application file for complete search history.

(56) References Cited

U.S. PATENT DOCUMENTS

| 5,504,726 | A |  | 4/1996 | Semba | |
| 6,141,303 | A | * | 10/2000 | Supino et al. | 369/44.28 |
| 6,147,467 | A | * | 11/2000 | Yu et al. | 318/561 |
| 6,970,403 | B2 |  | 11/2005 | Kadlec et al. | |
| 2001/0019525 | A1 | * | 9/2001 | Chan | 369/53.14 |
| 2002/0064104 | A1 | * | 5/2002 | Park et al. | 369/44.32 |
| 2002/0186624 | A1 | * | 12/2002 | Kadlec et al. | 369/44.28 |
| 2004/0066716 | A1 | * | 4/2004 | Yu | 369/44.29 |
| 2004/0141429 | A1 | * | 7/2004 | Kishimoto et al. | 369/30.14 |
| 2004/0156275 | A1 | * | 8/2004 | Ishikawa et al. | 369/30.17 |
| 2005/0030847 | A1 | * | 2/2005 | Hsu et al. | 369/44.28 |
| 2005/0073915 | A1 | * | 4/2005 | Lee | 369/30.1 |
| 2007/0133364 | A1 | * | 6/2007 | Serrano et al. | 369/44.29 |

FOREIGN PATENT DOCUMENTS

| TW | 482996 | 4/2002 |
| TW | 485339 | 5/2002 |

OTHER PUBLICATIONS

English language translation of abstract of TW 482996 (published Apr. 11, 2002).
English language translation of abstract of TW 485339 (published May 1, 2002).

* cited by examiner

*Primary Examiner* — Joseph Haley
*Assistant Examiner* — Emily Frank
(74) *Attorney, Agent, or Firm* — McClure, Qualey & Rodack, LLP

(57) ABSTRACT

The invention provides a method for adjusting a tracking error signal of an optical disk drive. First, a pickup head control signal is applied to an actuator to move a pickup head. The tracking error signal is then generated while the pickup head moves. The tracking error signal is then sampled and a characteristic value of the tracking error signal is determined. An adjustment signal is then generated according to the characteristic value and a target value. Finally, the tracking error signal is adjusted according to the adjustment signal.

19 Claims, 16 Drawing Sheets

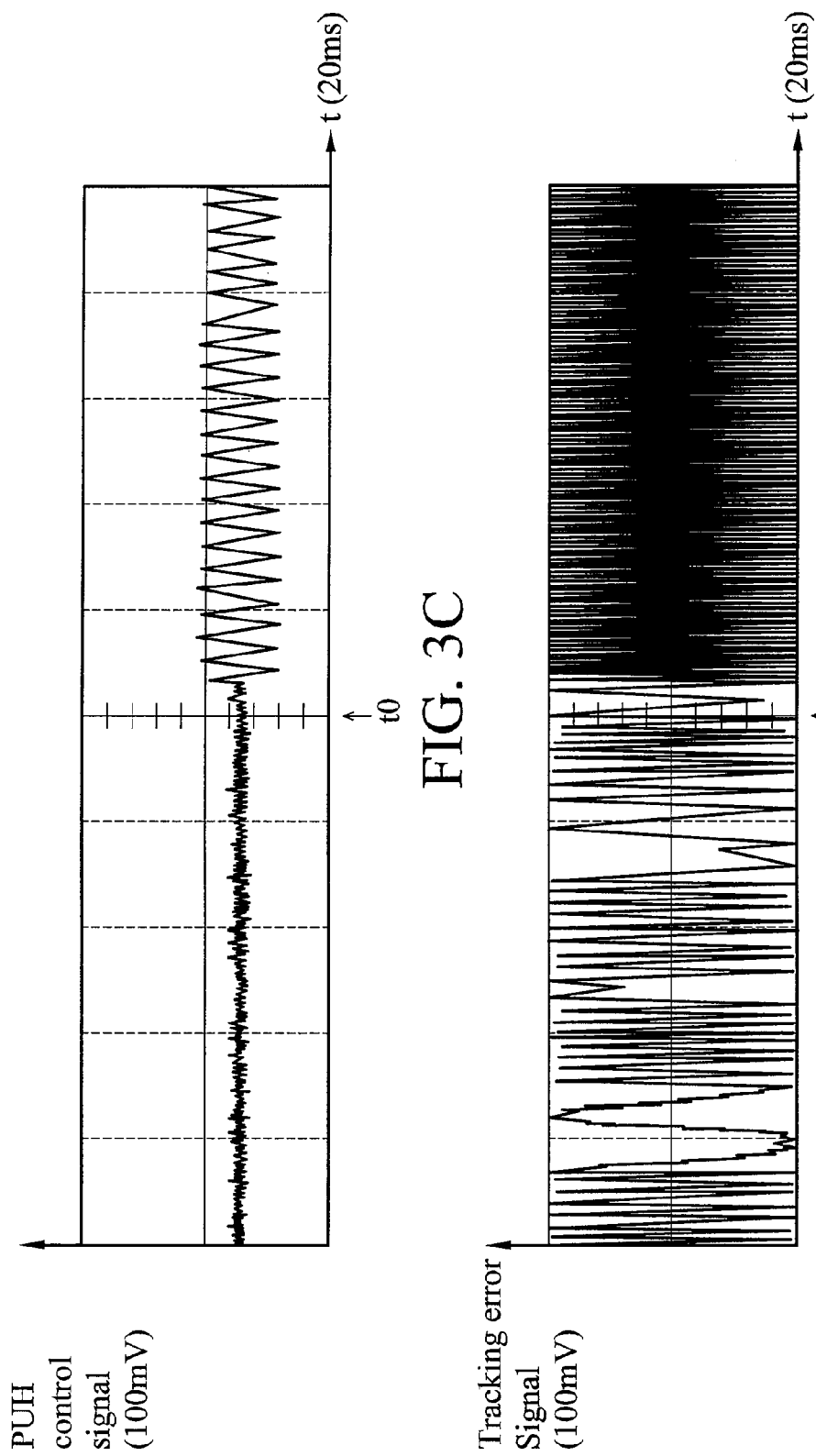

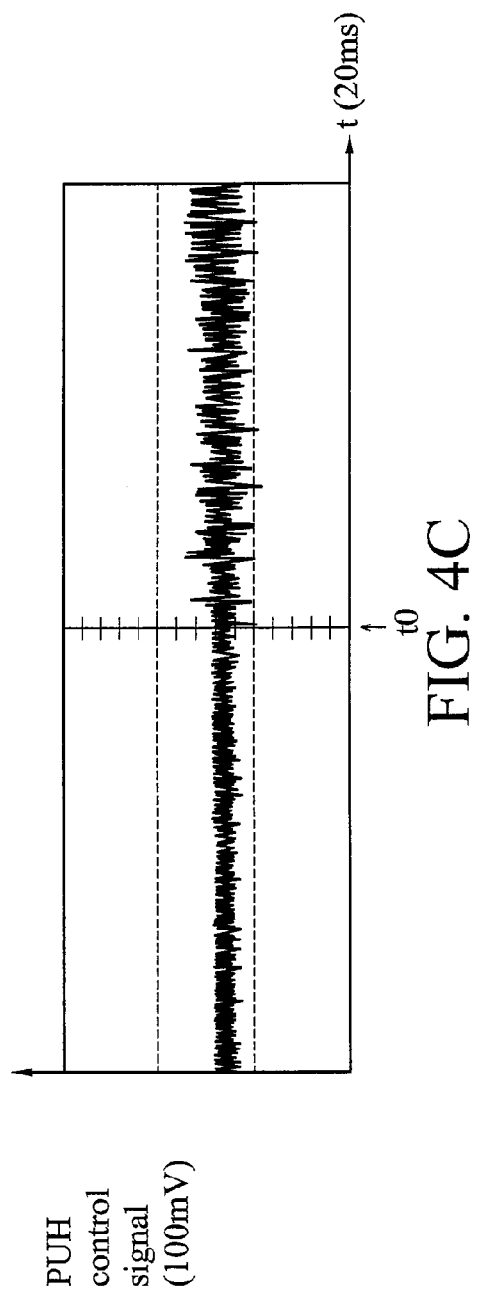

METHOD FOR CALIBRATING A TRACKING ERROR SIGNAL OF AN OPTICAL DISK DRIVE

CROSS REFERENCE TO RELATED APPLICATIONS

This application claims the benefit of U.S. Provisional Application No. 60/862,617 filed Oct. 24, 2006.

BACKGROUND OF THE INVENTION

1. Field of the Invention

The invention relates to optical disk drives, and more particularly to signal calibration of optical disk drives.

2. Description of the Related Art

A tracking error (TE) signal is one of the important servo control signals of an optical disk drive and corresponds to controlling the horizontal motion of a pickup head. Prior to using the tracking error signal as the source for controlling motion of the pickup head, the tracking error signal must be appropriately amplified to a target signal amplitude and compensated to a target signal level. This process is referred to as a calibration process. The calibration of a tracking error signal is important in optical disk drives. If the calibration does not precisely amplify and compensate the tracking error signal, the horizontal motion control of the pickup head is misdirected, thus, data retrieval from the optical disk drive is hindered.

The tracking error signal is often affected by a run-out phenomenon. FIG. 1A is a schematic diagram showing a run-out phenomenon. When an optical disk is inserted into an optical disk drive, the physical center 172 of the optical disk does not often coincide with the rotation center 160 of a turntable. Thus, when a spindle motor spins the turntable, the optical disk shifts left and right. The left-shifted optical disk 162 has a center located at position 172, and the right-shifted optical disk 164 has a center located at position 174. If the distance between the physical center of the optical disk and the rotation center of the turn table is d, the maximum shift distance of the optical disk, referred to as a run-out distance, is 2d, as shown in FIG. 1A.

When the disk has been spun and the run-out phenomenon occurs, a pickup head maintains at position 170 and generates a tracking error signal TE which can be used as the source for calibration. When the run-out phenomenon occurs, the physical center of the optical disk swings between the right-shifted position 174 and the left-shifted position 172. When the optical disk shifts to the left side, the stationary pickup head at position 170 is positioned over an inner track 182 of the optical disk. When the optical disk shifts to the right side, the stationary pickup head at position 170 is positioned over an outer track 184, which is the track 194 when the physical center swings to the left-shifted position 172. Thus, when the run-out phenomenon occurs, the stationary pickup head at position 170 has relative motion with the optical disk. The stationary pickup head relatively cross multiple tracks between the tracks 194 and 182, as shown in FIG. 1A, when the optical disk has been rotated, and a sinusoidal tracking error signal, as shown in FIG. 2A, induced by crossing tracks is obtained.

Referring to FIG. 1B, a block diagram of an optical disk drive 100 calibrating a tracking error signal is shown. The optical disk drive 100 comprises a pickup head 102, a sampling module 104, a comparator 106, a calibration module 108, and a compensator 110. During calibration process, the pickup head 102, stationary positioned over the optical disk, first generates a tracking error signal which probably affected by a run-out phenomenon. The sampling module 104 then samples the tracking error signal to obtain characteristic values of the tracking error signal per sampling period. In one embodiment, the characteristic value comprises an average peak-to-peak voltage and an average offset voltage. The comparator 106 then compares the characteristic value with a predetermined target value to determine an adjustment signal. In one embodiment, the adjustment signal comprises a gain adjustment signal and an offset adjustment signal. The calibration module 108 comprises an amplifier 112 and an offset module 114. The amplifier 112 amplifies the tracking error signal according to the gain adjustment signal to obtain a first adjusted tracking error signal TE' with a desirable amplitude, and the offset module 114 then offsets the first adjusted tracking error signal TE' to obtain a second adjusted tracking error signal TE" with a desirable offset level.

During an normal operation, the compensator 110 can then determines a tracking control signal TRO according to the second adjusted tracking error signal TE" to move the pickup head 102. Thus, movement of the pickup head 102 compensates the swing disturbance of the optical disk to control the pickup head keeping following a track. Referring to FIG. 1C, a wave form of a tracking error signal is shown. The tracking error signal before time t1 swings due to a run-out phenomenon. After a TRO signal is applied to move the pickup head at time t1, the tracking error signal is getting stable.

FIG. 2A shows an example of a tracking error signal obtained when a run-out phenomenon occurs. The tracking error signal comprises two return points 212 and 214. The return points 212 and 214 are the points where phase of the tracking error signal inverts. The return points occur when the physical center of optical disk moves to position 172 or position 174 in FIG. 1A. The periods of the regions 202 and 206 respectively containing the return points 212 and 214 are referred to as "return time". Each peak between the return points 212 and 214 are caused by a track crossing the pickup head while the optical disk drive swings due to the run-out phenomenon.

An optical disk may be clamped at different positions while tray-in into the optical disk drive; therefore the run-out distance d, as shown in FIG. 1A, accordingly is variable. FIG. 2B shows the distributions of a run-out amount verses the return time of a 100-time tray-in test using the same disk. A run-out amount indicates a number of peaks occurring between return points of the tracking error signal and is proportional to a run-out distance. The test result shows that the run-out amount is variable and has an average of 70 tracks, and the return time is also variable and has an average of 4 ms. It is noted from FIG. 2B, there are still extreme situations, however, with large return times or small run-out amounts, such as points 220~224. Such extreme situations may cause errors in tracking error signal calibration.

When the run-out shift distance is short such as the points 220~224 in FIG. 2B with a small run-out amount, the run-out shift distance overlaps only a few tracks, i.e. the run-out amount is small, and only a few peaks are generated in the tracking error signal when the optical disk rotates. For example, the tracking error signal shown in FIG. 2A has a run-out shift distance of about only 5 tracks, because only five peaks occur in the range 204 between the return points 212 and 214. Thus, the frequency of the tracking error signal is very low in this extreme situation. The sampling module 104, however, samples the tracking error signal with the same sampling rate in the described extreme situation to obtain the characteristic values per sampling period. Because the frequency of the tracking error is low, periodically sampled characteristic values may not accurate represent the real characters of the tracking error signal, inducing inappropriate amplification and offset compensation and affecting the calibration of the tracking error signal in the calibration module 108. FIG. 2C shows a calibration result of the tracking error signal when the run-out amount is about 15 tracks. The calibration result shows that the peak-to-peak voltages and offset voltages of the calibrated tracking error signals greatly deviate from the target peak-to-peak voltage of 1.8V and the offset voltage of 1.38V. Thus, a method for adjusting a tracking error signal of an optical disk drive is required.

BRIEF SUMMARY OF THE INVENTION

The invention provides a method for adjusting a tracking error signal of an optical disk drive. First, a pickup head control signal is applied to an actuator to move a pickup head. The tracking error signal is then generated while the pickup head moves. The tracking error signal is then sampled and a characteristic value of the tracking error signal is determined. An adjustment signal is then generated according to the characteristic value and a target value. Finally, the tracking error signal is adjusted according to the adjustment signal.

The invention also provides an adjustment apparatus for adjusting a tracking error signal of an optical disk drive. The adjustment apparatus comprises a signal generator, a pickup head, a sampling module, a comparator, and a calibration module. The signal generator generates a pickup head control signal. The pickup head is driven by the pickup head control signal and generates the tracking error signal while moving. The sampling module samples the tracking error signal and determines a characteristic value of the tracking error signal. The comparator generates an adjustment signal according to the characteristic value and a target value. Finally, the calibration module adjusts a tracking error signal according to the adjustment signal.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 3C shows a pickup head control signal applied to an actuator to move the pick-up head;

FIG. 3D shows a track crossing signal corresponding to the pickup head control signal of FIG. 3C;

FIG. 4C shows a pickup head control signal obtained by filtering an adjusted tracking error signal with a band pass filter;

FIG. 4D shows a track crossing signal corresponding to the pickup head control signal of FIG. 4C;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

A method for adjusting a tracking error signal of optical disks is provided. A pickup head control signal is applied to an actuator, such as a tracking coil and/or a stepping motor, of a pickup head to repeatedly move the pickup head back and forth, and the pickup head generates the tracking error signal. Because the pickup head repeatedly moves back and forth, the frequency and number of the tracks crossed by the pickup head is increased in comparison with the stationary pickup head in the conventional method, and the frequency of the generated tracking error signal is also increased. Thus, the affection of run-out phenomena can be eliminated or ignored, and the frequency of the tracking error signal is not lowered even in the extreme situation of small run-out amount. Moreover, the tracking error signal with higher frequency can be accurately sampled and can be precisely calibrated. In addition, because the frequency of the tracking error signal is increased, the sampling rate can also be increased, thus, the time for acquiring an adequate number of samples is reduced, and the total calibration time is also reduced.

Figure 3A:
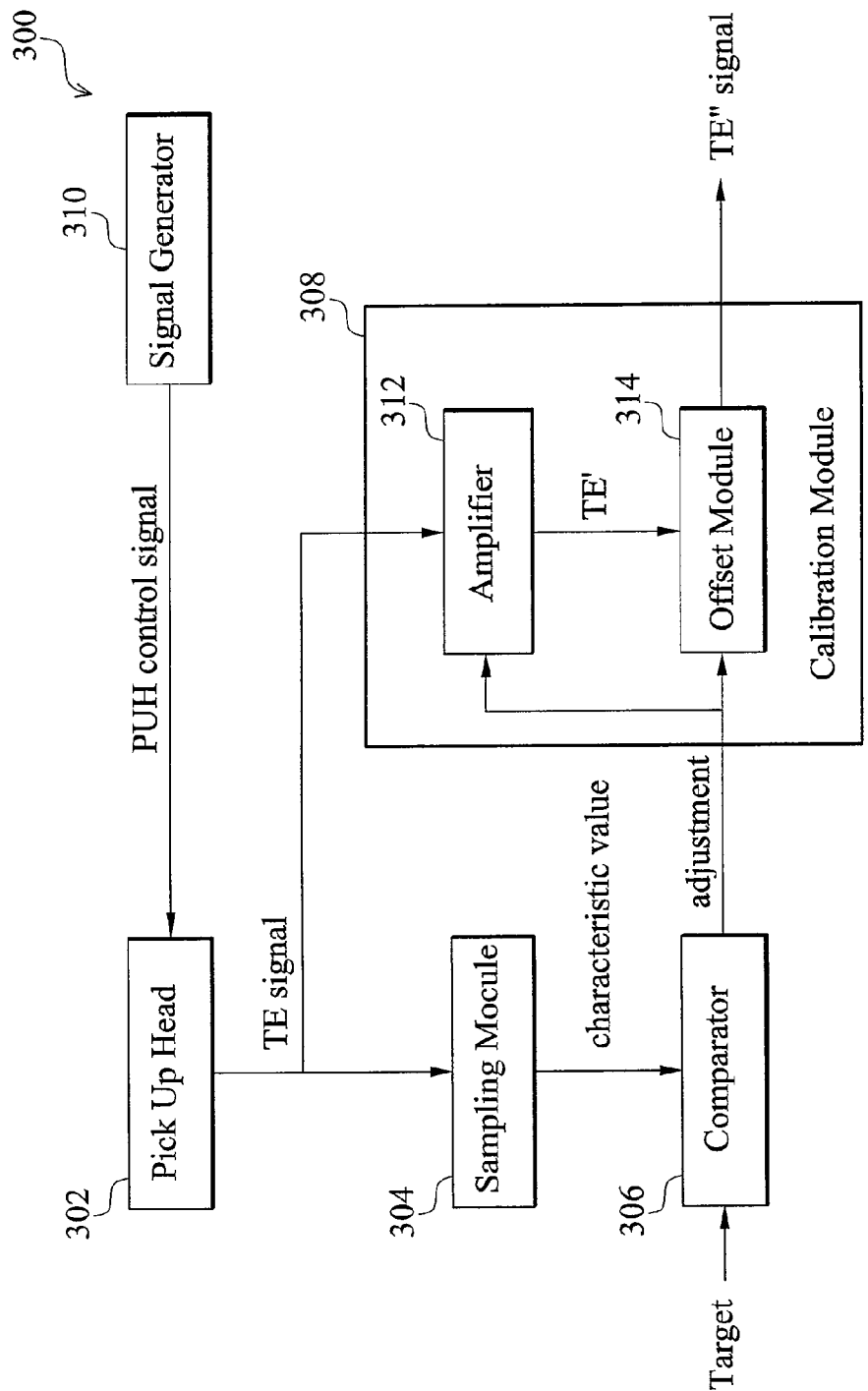
FIG. 3A is a block diagram of an adjustment apparatus of an optical disk drive adjusting a tracking error signal according to the invention.
Figure 3B:
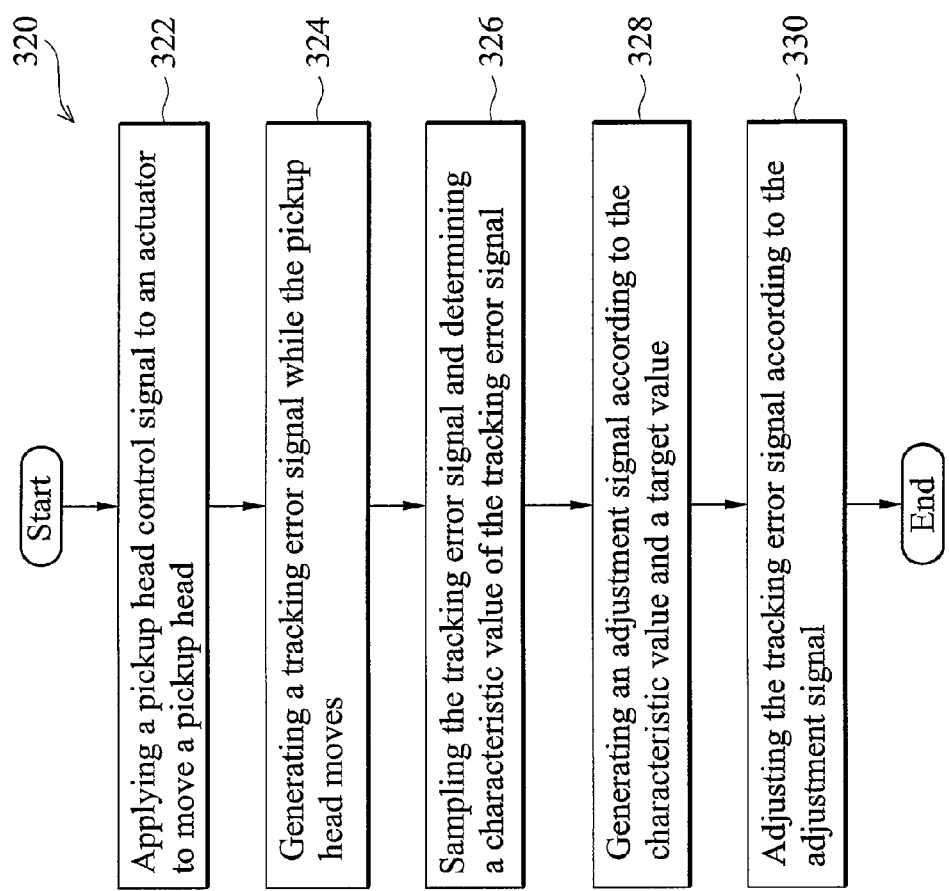
FIG. 3B is a flowchart of a method for adjusting the tracking error signal according to the invention.

FIG. 3A is a block diagram of an adjustment apparatus of an optical disk drive 300 adjusting a tracking error signal according to the invention. The optical disk drive 300 comprises a pickup head 302, a sampling module 304, a comparator 306, a calibration module 308, and a signal generator 310. The optical disk drive 300 adjusts the tracking error signal according to a method 320 shown in FIG. 3B. During the calibration process, the signal generator 310 first applies a pickup head control signal to an actuator, such as a tracking coil and/or a steeping motor, to move the pickup head 302 (step 322). In one embodiment, the pickup head control signal is a periodic square wave or a periodic sinusoidal wave periodically moving the pickup head back and forth parallel to the surface of the optical disk. FIG. 3C shows a pickup head control signal applied to the actuator to move the pick-up head. The pickup head 302 then generates a tracking error signal (step 324). FIG. 3D shows the tracking error signal corresponding to the pickup head control signal of FIG. 3C. Before time t0, the pickup head control signal does not apply to the actuator and the pickup head is stationary. Thus, the tracking error signal before time t0 in FIG. 3D has a low frequency. After time t0, the pickup head control signal, such as with 5 ms period and 70 mV amplitude, is applied to the actuator to move the pickup head back and forth. Thus, the frequency of the tracking error signal in FIG. 3D is greatly increased after time t0.

The sampling module 304 then samples the tracking error signal and determines characteristic values of the tracking error signal (step 326). As previously stated, the sampling accuracy is increased with the higher frequency of the tracking error signal, further improving the calibration accuracy. In one embodiment, the characteristic values comprise a peak-to-peak level of the tracking error signal and an offset level of the tracking error signal. The comparator 306 then compares the characteristic value with a predetermined target value to determine an adjustment signal (step 328). In one embodiment, the adjustment signal comprises a gain value to amplify the tracking error signal and a compensation value to compensate the tracking error signal. The gain value indicates a ratio of a target peak-to-peak level and the peak-to-peak level of the tracking error signal, and the compensation value indicates a difference of a target offset level and the offset level of the tracking error signal.

The calibration module 308 then adjusts the tracking error signal according to the adjustment signal (step 330). In one embodiment, the calibration module 308 comprises an amplifier 312 and an offset module 314. The amplifier 312 amplifies the tracking error signal according to the gain value of the adjustment signal to obtain a first adjusted tracking error signal TE' with a desirable amplitude level. The offset module 314 then offsets the first adjusted tracking error signal TE' according to the compensation value of the adjustment signal to obtain a second adjusted tracking error signal TE" with a desirable offset level.

In consequence, during an normal operation a compensator can then determines a tracking control signal TRO according to the second adjusted tracking error signal TE" to move the pickup head 302. Thus, movement of the pickup head 302 derived by the tracking control signal TRO compensates the swing disturbance of the optical disk to control the pickup head keeping following a track.

Figure 3E:
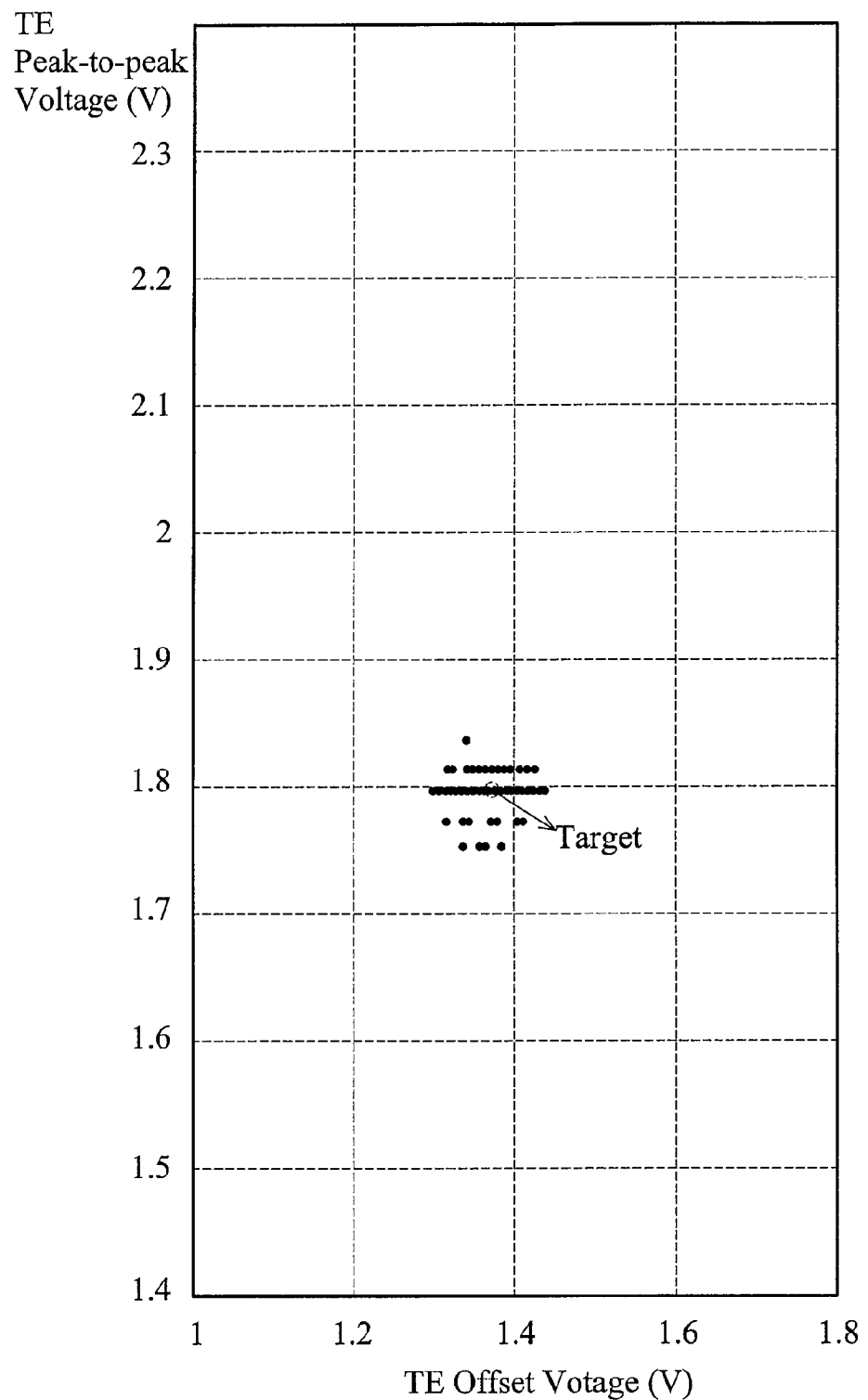
FIG. 3E shows a calibration result when a pickup head is moved according to the pickup head control signal.

FIG. 3E shows the calibration result of the tracking error signal of this embodiment when the pickup head is moved back and forth according to the pickup head control signal. The peak-to-peak voltages and offset voltages of the calibrated tracking error signals are close to the target peak-to-peak voltage of 1.8V and the target offset voltage of 1.38V. The calibration result of FIG. 3E indicates that the calibration accuracy is greatly improved.

Figure 1A:
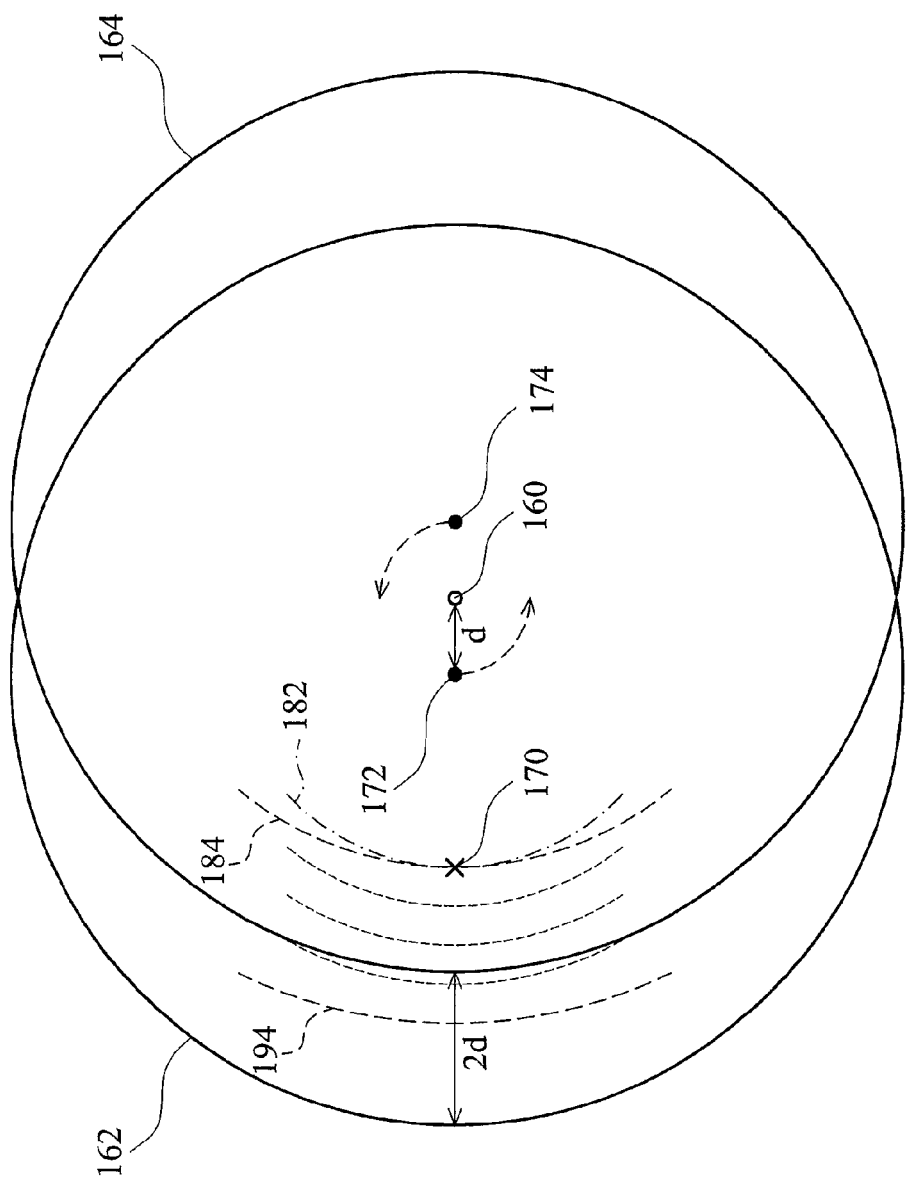
FIG. 1A is a schematic diagram showing a run-out phenomenon.
Figure 1B:
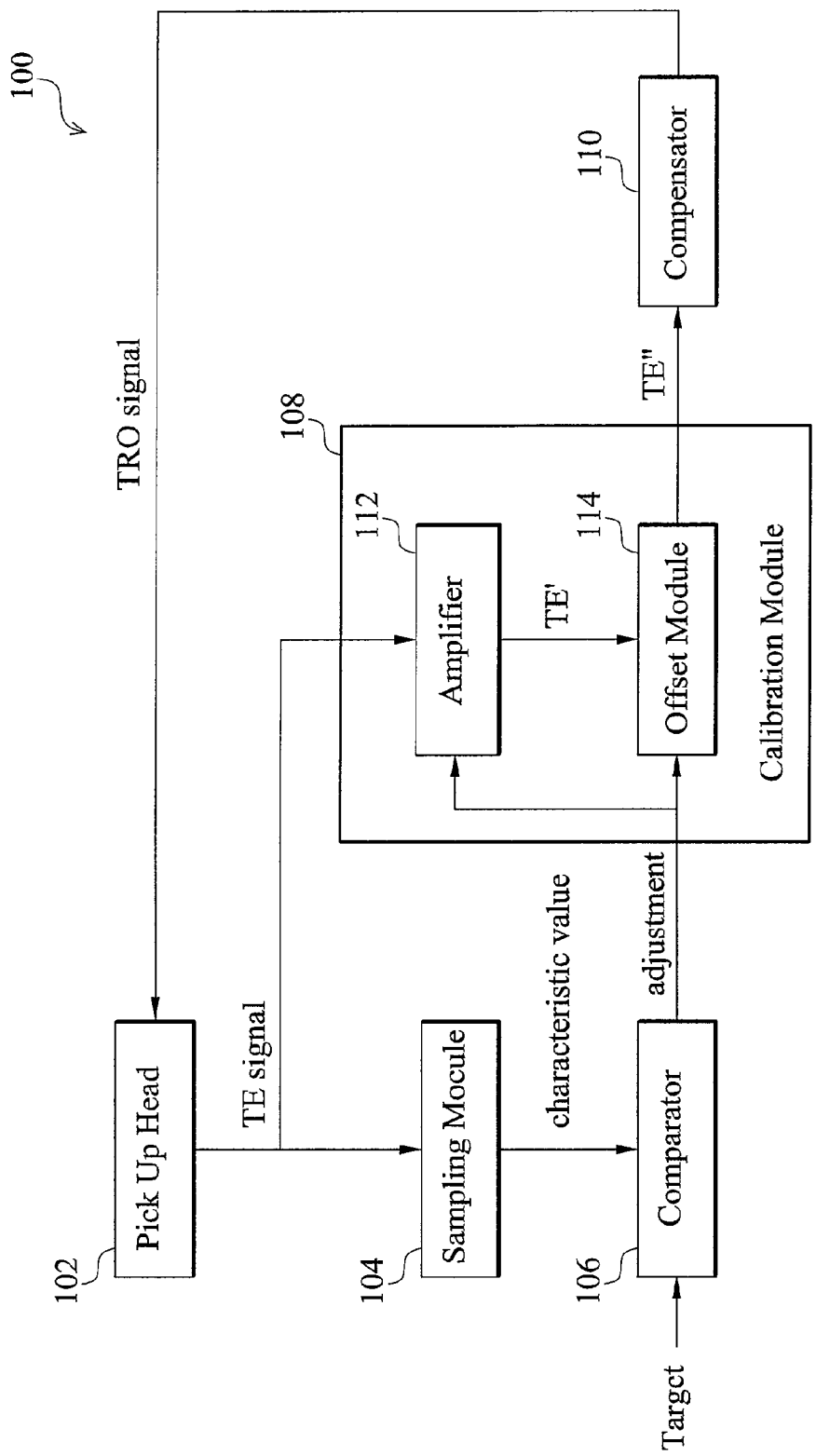
FIG. 1B shows a block diagram of an optical disk drive calibrating a tracking error signal.
Figure 1C:
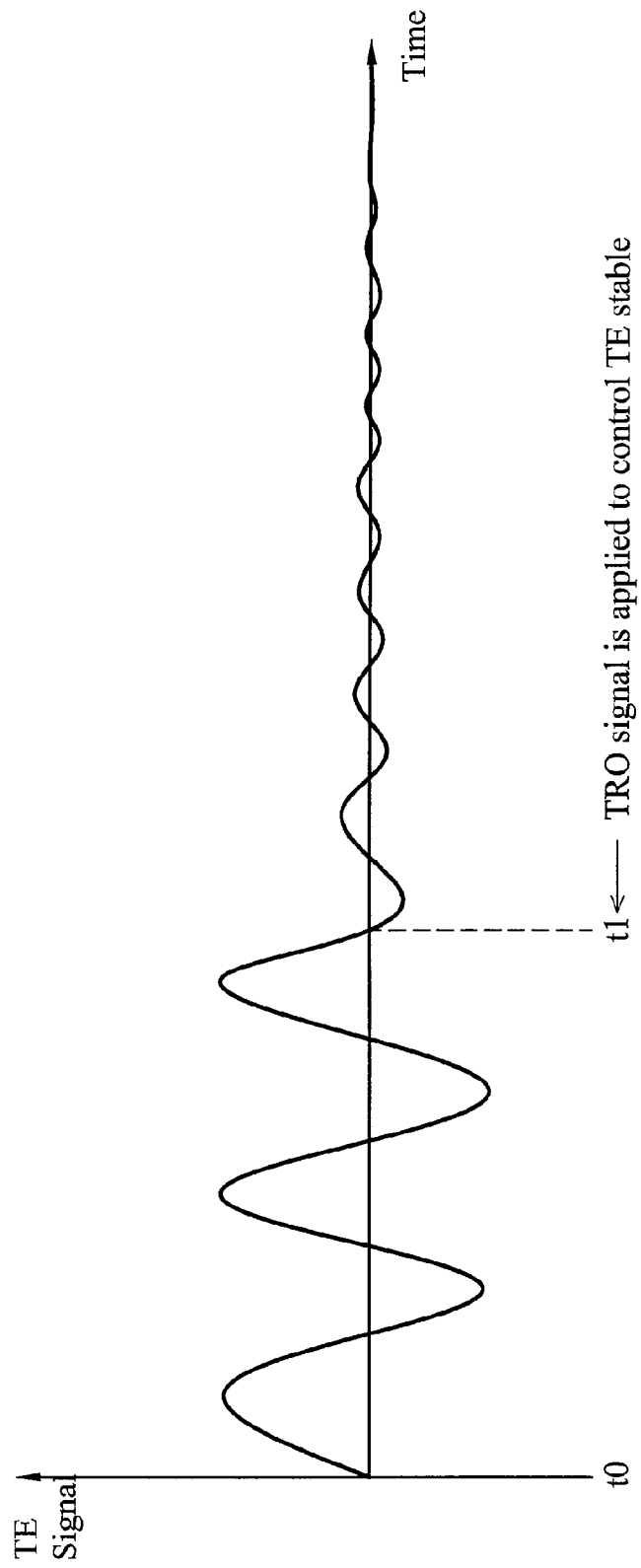
FIG. 1C shows a wave form of a tracking error signal.
Figure 2A:
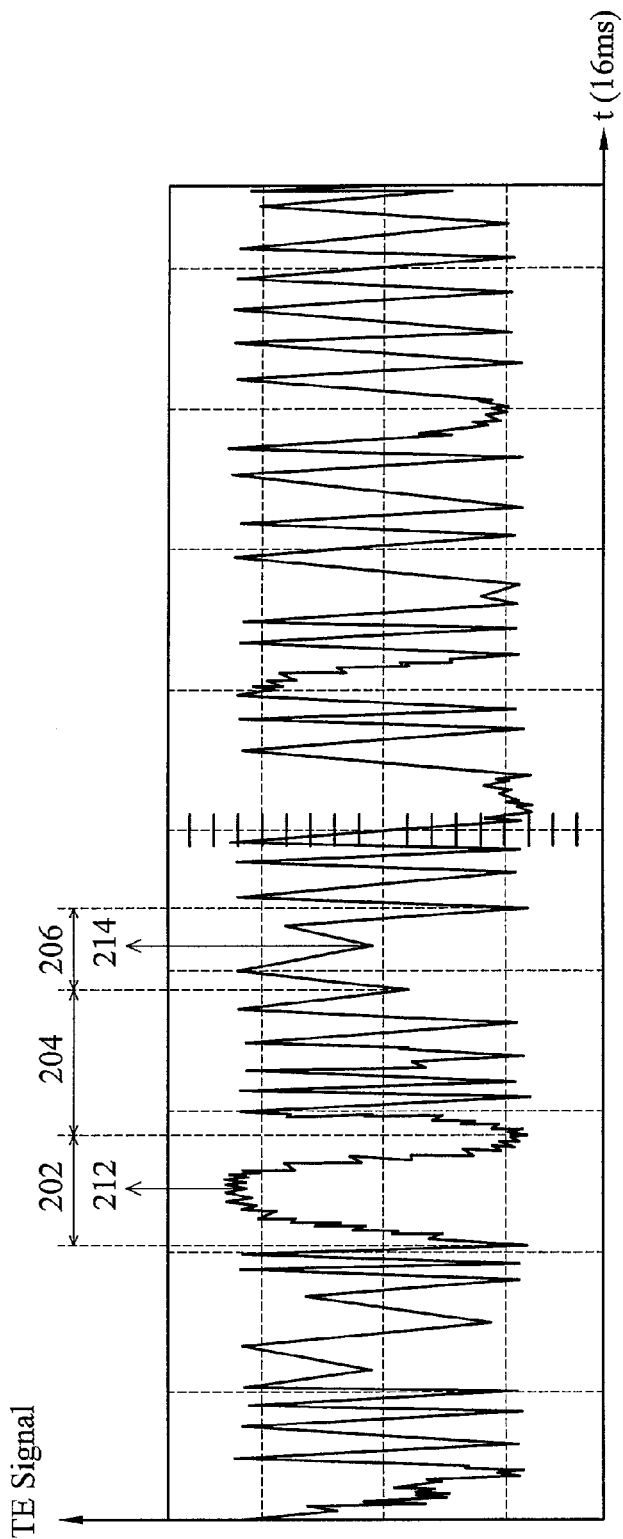
FIG. 2A shows an example of a tracking error signal obtained when a run-out phenomenon occurs.
Figure 2B:
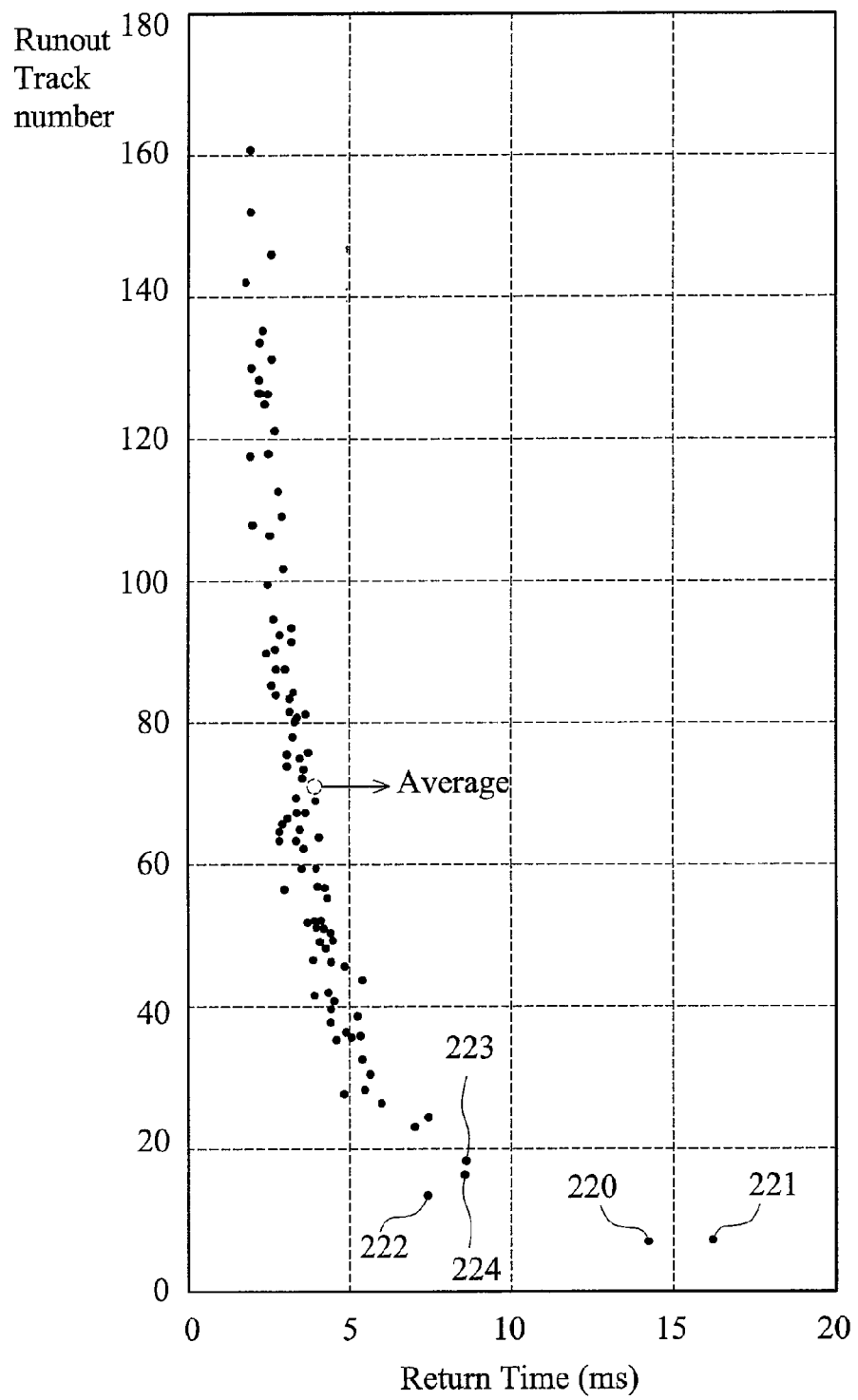
FIG. 2B shows the distributions of the run-out amount verses the return time of a 100-time tray-in test.
Figure 2C:
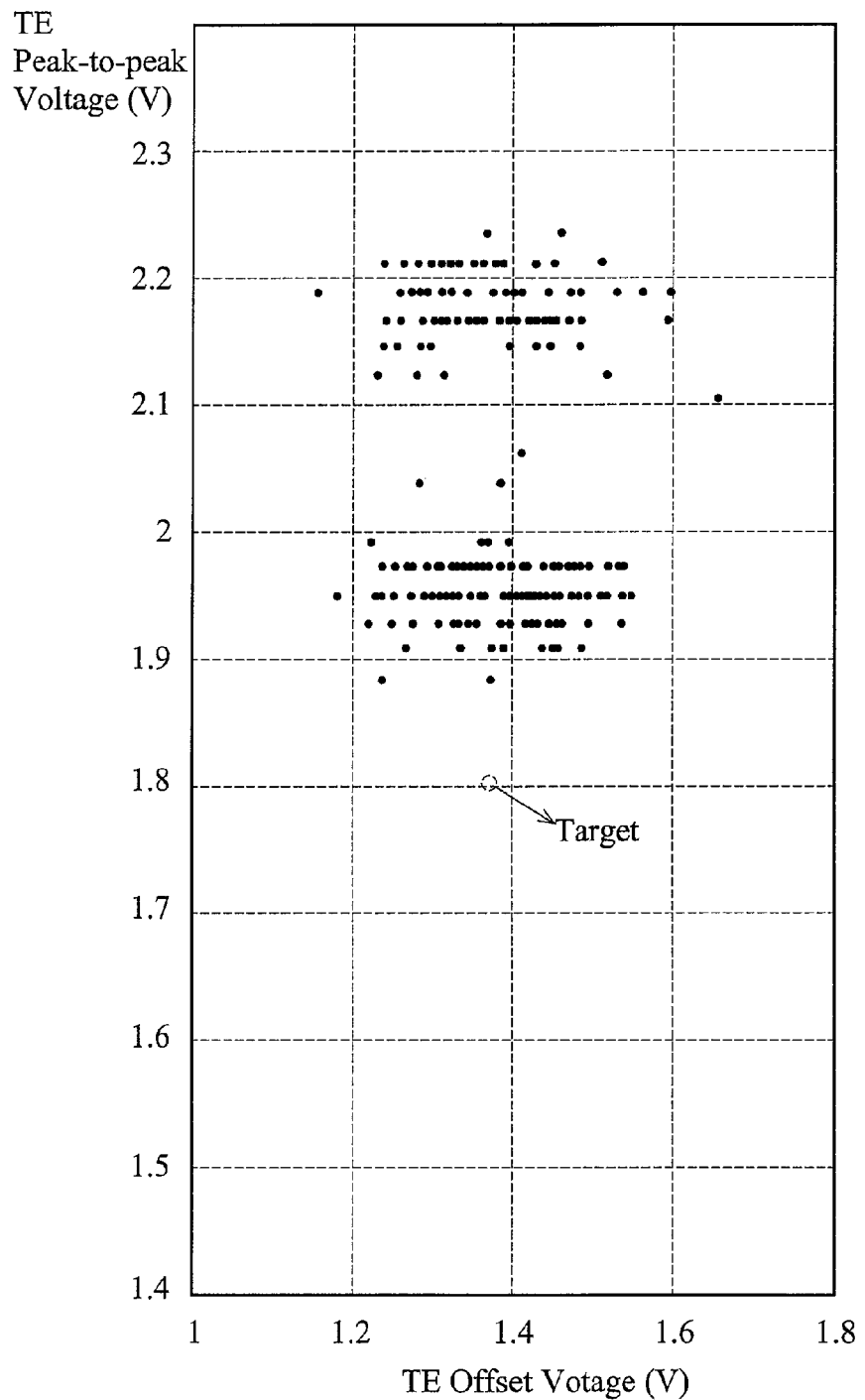
FIG. 2C shows a calibration result of the tracking error signal when the run-out amount is about 15 tracks.

The signal generator 310 generates the pickup head control signal in a few ways. In one embodiment, the sampling module 304 first determines a run-out amount of the optical disk drive according to the tracking error signal. The optical disk is first spun when the optical disk is inserted into the optical disk drive. The pickup head 302 then generates a tracking error signal while the pickup head 302 keep stationary, and the sampling module 304 then registers a number of peaks occurring between return points of the tracking error signal to determine the run-out amount, wherein the phase of the tracking error signal is inverted at the return points, such as the return points 212 and 214 of FIG. 2A. The signal generator 310 then generates the pickup head control signal according to the run-out amount. In one embodiment, the pickup head control signal drives the actuator with a driving force in inverse proportion to the run-out amount. Thus, when the run-out amount is small, the signal generator 310 generates a pickup head control signal with large amplitude and a high frequency to actuate the moving of the pickup head to increase the frequency of the tracking error signal. Thus, the pick-up head 302 may generates a tracking error signal with a high frequency when an optical disk has a small run-out amount, and more accurate characteristic values can be obtained to determine a more precise adjustment signal to calibrate the tracking error signal.

Figure 4A:
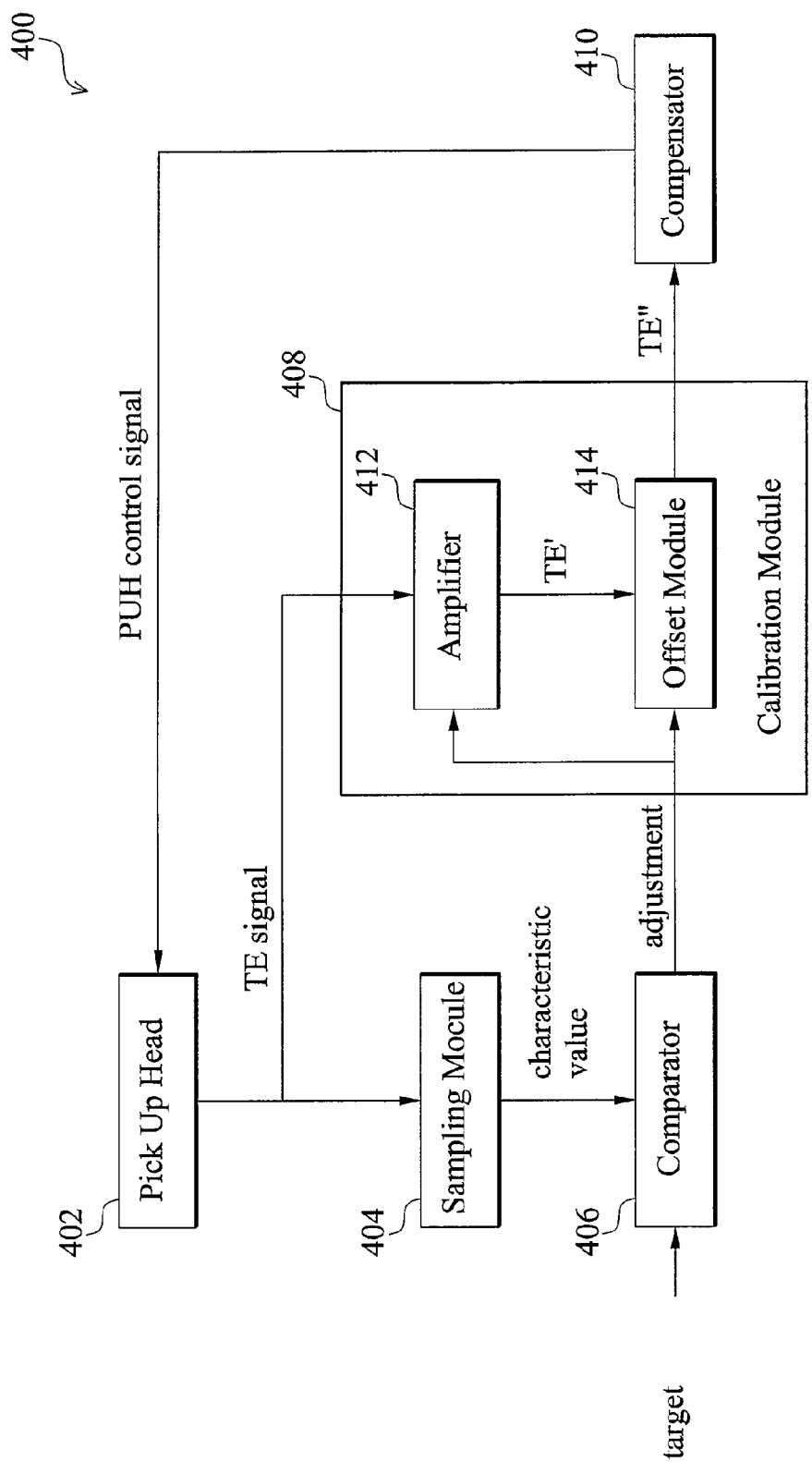
FIG. 4A is a block diagram of an optical disk drive adjusting a tracking error signal according to the invention.
Figure 4B:
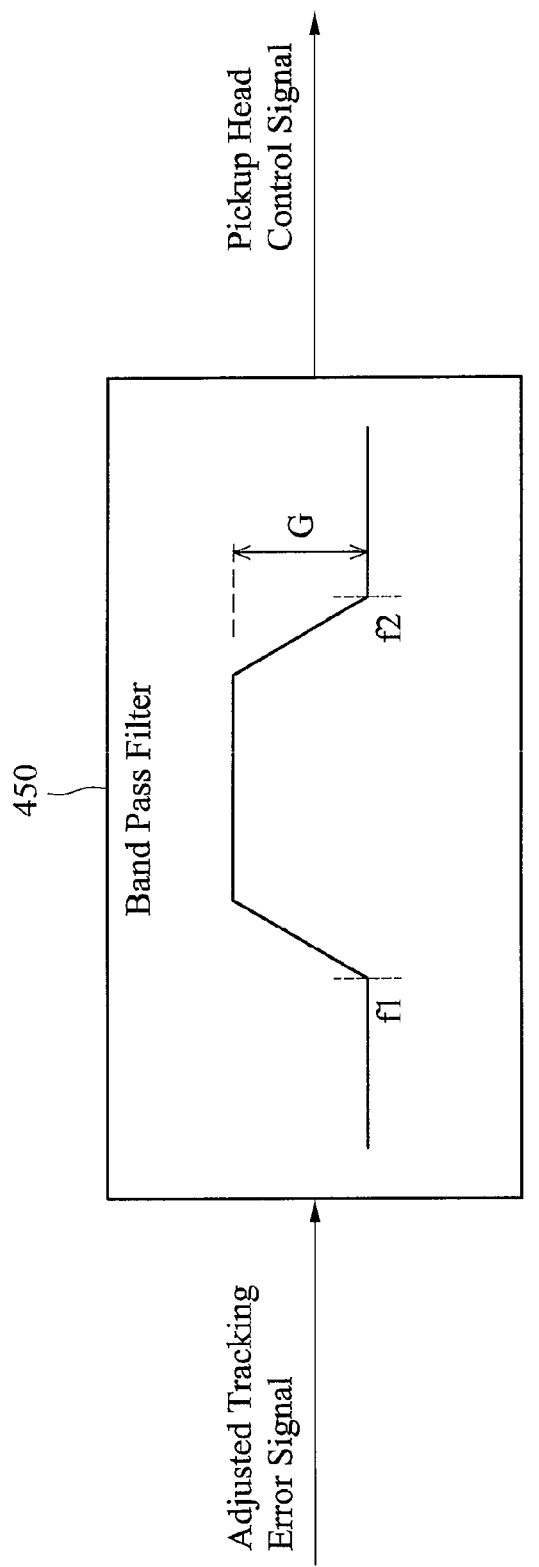
FIG. 4B shows a schematic diagram of a band pass filter filtering an adjusted tracking error signal.

In another embodiment, the signal generator derives the pickup head control signal from the second adjusted tracking error signal TE". FIG. 4A is a block diagram of an optical disk drive 400 adjusting a tracking error signal according to the invention. The optical disk drive 400 is similar to the optical disk drive 300, except for the signal generator 310 is replaced with a band pass filter 410. The band pass filter 410 filters the adjusted tracking error signal TE" to generate the pickup head control signal. In one embodiment, the sampling module 404 first determines a run-out amount according to the tracking error signal, and the band pass filter 410 then determines a gain value for filtration of the adjusted tracking error signal TE" according to the run-out amount. FIG. 4B shows a schematic diagram of a band pass filter 450 filtering the adjusted tracking error signal. The band pass filter 450 has a lower cut-off frequency f1 and a higher cut-off frequency f2. Only the portion of the adjusted tracking error signal TE" fits in the frequency band between the lower cut-off frequency f1 and the higher cut-off frequency f2 is passed and amplified with a gain G to obtain the pickup head control signal. The cut-off frequencies f1 and f2 and the gain G are determined according to the run-out amount and/or return time. The gain G is proportion to the run-out amount.

FIG. 4C shows a pick-up head control signal obtained by filtering an adjusted tracking error signal with a band pass filter. Subsequent to filtering of the adjusted tracking error signal TE" by the band pass filter 450, a pickup head control signal is applied to the actuator, such as a tracking coil and/or a stepping motor, to move the pickup head 402. Before time t0, the pickup head control signal has not been applied to the actuator and the pickup head is stationary. Thus, the tracking error signal in FIG. 4C has a low frequency. At time to, the pickup head control signal derived from the tracking error signal is applied to the actuator to move the pickup head. Thus, the frequency of a tracking error signal shown in FIG. 4D is greatly increased after time t0. As previously stated, the sampling accuracy is increased with the frequency of the tracking error signal, further improving the calibration accuracy. Thus, the calibration accuracy of the tracking error signal is greatly improved after the pickup head control signal has been applied.

Figure 5:
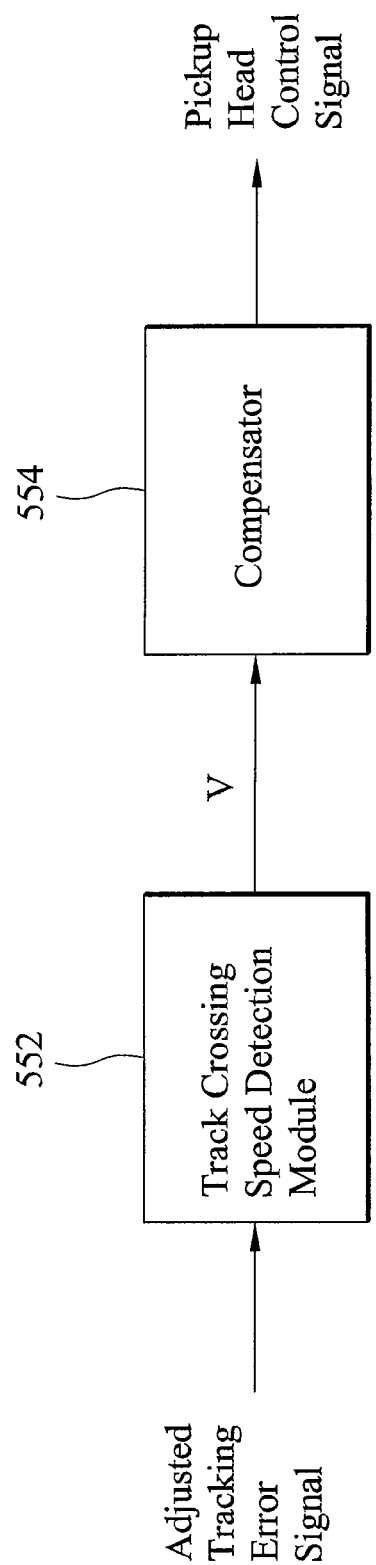
FIG. 5 is a block diagram of a signal generator generating the pickup head control signal according to a track-crossing speed signal.

In another embodiment, the pickup head control signal may generated from a track-crossing speed signal indicating a track-crossing speed of a tracking error signal. FIG. 5 shows a block diagram of a signal generator 500 generating the pickup head control signal according to a track-crossing speed signal. The signal generator 500 includes a track-crossing speed detection module 552 and a compensator 554. The track-crossing speed detection module 552 first generates a track-crossing speed V of the pickup head according to the adjusted tracking error signal TE" output by a calibration module 308. The compensator 554 then generates the pickup head control signal according to the track-crossing speed V. The pickup head control signal is then applied to the actuator, such as a tracking coil and/or a stepping motor, to move the pickup head 302. Thus, the frequency of the tracking error signal is increased after the pickup head is moved back and forth, and the calibration accuracy is improved. In one embodiment, the compensator 554 could be a notch filter.

Besides periodically sampling the tracking error signal in the same sampling rate. The invention further provides another sampling method to sample the tracking error signal to obtain characteristic values of the tracking error signal.

Figure 6A:
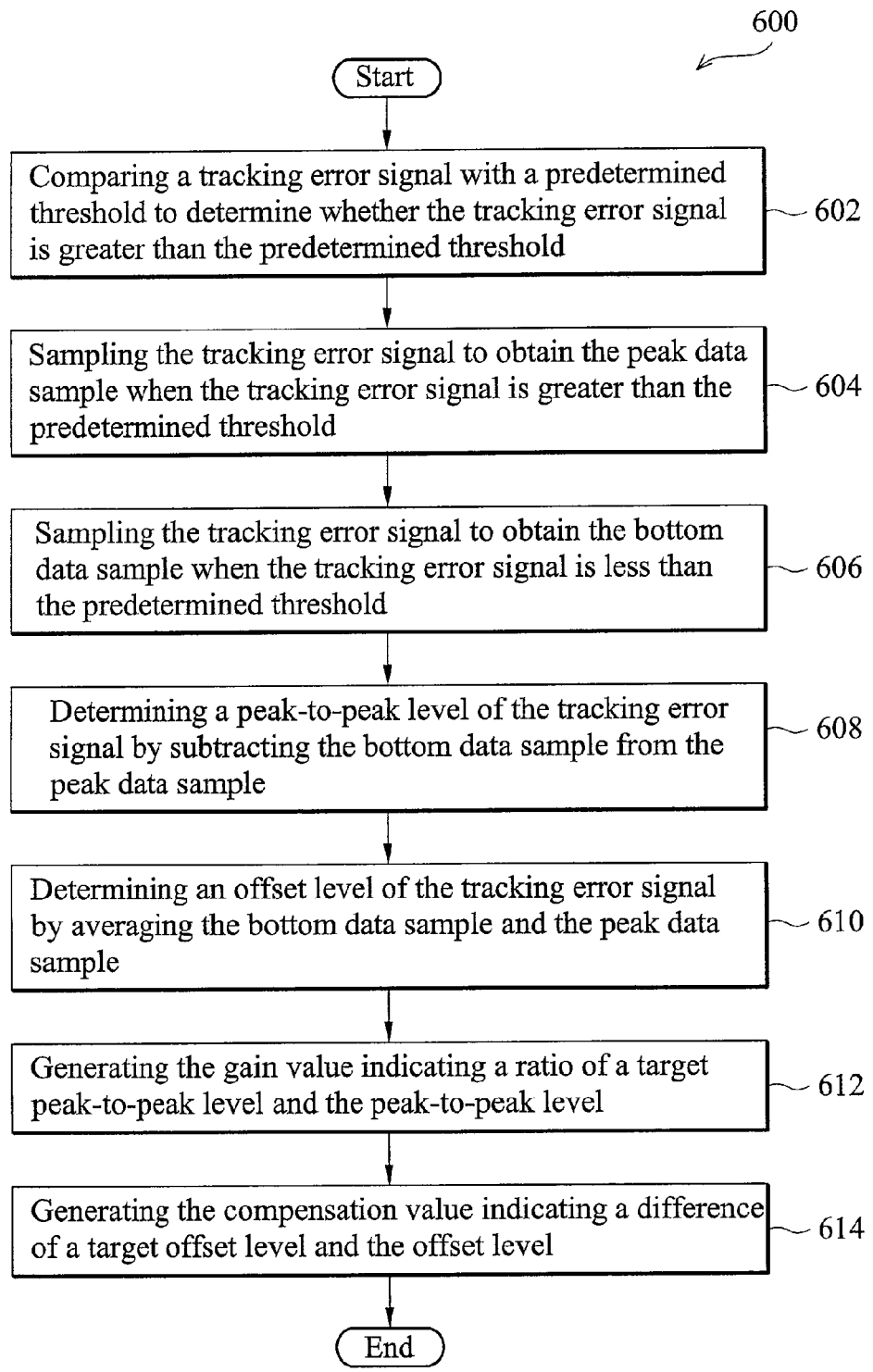
FIG. 6A is a flowchart of a method for sampling a tracking error signal and adjusting a tracking error signal according to the invention.
Figure 6B:
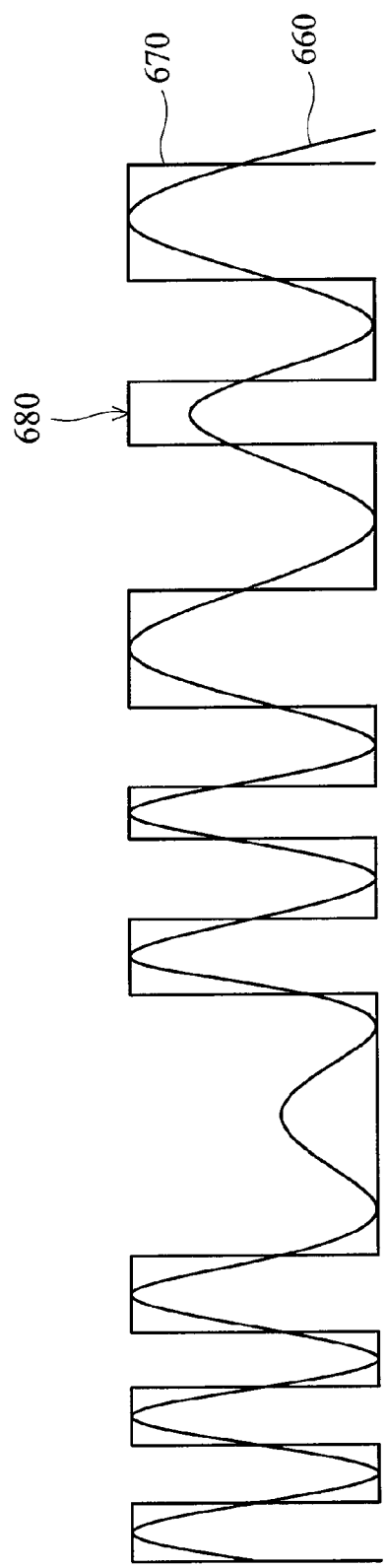
FIG. 6B shows a wave form of a zero crossing signal.

FIG. 6A is a flowchart of a method 600 for sampling a tracking error signal and accordingly generating the adjustment signals for adjusting the tracking error signal according to the invention. The characteristic values comprise a peak data sample and a bottom data sample. FIG. 6B shows a wave form of a zero crossing signal. The sampling module 304 first compares the tracking error signal with a predetermined threshold to determine whether the tracking error signal is greater than the predetermined threshold (step 602), and a binary zero crossing signal 670 is obtained. The sampling module 304 then samples the tracking error signal to obtain the peak data sample when the zero crossing signal 670 is at a high level (step 604). The sampling module 304 also samples the tracking error signal to obtain the bottom data sample when the zero crossing signal 670 is at a low level (step 606). Thus, the sampling timing is aligned with the peak value of the tracking error signal. Therefore, the sampling method 600 improves the sampling accuracy.

The sampling module 304 then determines a peak-to-peak level of the tracking error signal by subtracting the bottom data sample from the peak data sample (step 608) and determines an offset level of the tracking error signal by averaging the bottom data sample and the peak data sample (step 610). The comparator 306 then generates an adjustment signal comprising a gain value and a compensation value according to the peak-to-peak level and the offset level, and the gain value indicating a ratio of a target peak-to-peak level and the peak-to-peak level (step 612), and generates the compensation value indicating a difference of a target offset level and the offset level (step 614). Thus, the calibration module 308 can precisely adjusts the tracking error signal according to the gain value and the compensation value.

Comparison with the conventional calibration method, the invention provides a method for adjusting a tracking error signal of an optical disk drive. A pickup head is actuated to move for generating a tracking error signal with higher frequency than that of while the pickup head keeps stationary. More particularly, the conventional calibration method which is affected by the run-out phenomena implements a stationary pickup head in cooperating with a rotating optical disk to generate the tracking error signal for calibration. However, the invention provides a calibration method which the run-out phenomena is eliminated or ignored implements a moving pickup head and regardless of the optical disk is rotated or not to generate a higher frequency tracking error signal for calibration. In addition, because the frequency of the tracking error signal is increased by moving the pickup head back and forth, the tracking error signal can be sampled with a higher sampling rate, reducing the sampling time and improving the sampling precision. Thus, a tracking error signal is precisely calibrated according to the data samples, improving the performance of the optical disk drive.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for adjusting a tracking error signal of an optical disk drive, comprising:
    applying a pickup head control signal to move a pickup head to cross tracks of an optical disk during a calibration process, wherein the calibration process is performed prior to using the tracking error signal for controlling motion of the pickup head to a specified target position;
    generating the tracking error signal;
    sampling the tracking error signal and determining a characteristic value of the tracking error signal;
    generating an adjustment signal according to the characteristic value and a target value;
    adjusting the tracking error signal according to the adjustment signal to obtain an adjusted tracking error signal; and
    generating a tracking control signal according to the adjusted tracking error signal to control the pickup head.

2. The method as claimed in claim 1, wherein the actuator periodically moves the pickup head back and forth parallel to the surface of the optical disk.

3. The method as claimed in claim 1, further comprising:
    determining a run-out amount of the optical disk drive according to the tracking error signal.

4. The method as claimed in claim 3, wherein the pickup head control signal is generated according to the run-out amount.

5. The method as claimed in claim 4, wherein the pickup head control signal drives the actuator with a driving force in inverse proportion to the run-out amount.

6. The method as claimed in claim 3, the step of determining the run-out amount comprising:
    spinning the optical disk when the optical disk is inserted into the optical disk drive;
    generating the tracking error signal while the pickup head keeps stationary;
    registering a number of peaks occurring between return points of the tracking error signal to determine the run-out amount;
    wherein the phase of the tracking error signal is inverted at the return points.

7. The method as claimed in claim 1, wherein the pickup head control signal is a periodic square wave or a periodic sinusoidal wave generated from a signal generator.

8. The method as claimed in claim 1, further comprising:
    filtering an adjusted tracking error signal with a band pass filter to generate the pickup head control signal.

9. The method as claimed in claim 1, further comprising:
    determining a run-out amount of the optical disk drive;
    filtering an adjusted tracking error signal with a band pass filter to generate the pickup head control signal;
    wherein gain of the band pass filter is determined according to the run-out amount.

10. The method as claimed in claim 1, wherein the characteristic value comprises a peak data sample and a bottom data sample, and the step of sampling the tracking error signal and determining the characteristic value of the tracking error signal comprises:
    comparing the tracking error signal with a predetermined threshold to determine whether the tracking error signal is greater than the predetermined threshold;
    sampling the tracking error signal to obtain the peak data sample when the tracking error signal is greater than the predetermined threshold; and
    sampling the tracking error signal to obtain the bottom data sample when the tracking error signal is less than the predetermined threshold.

11. The method as claimed in claim 10, wherein the adjustment signal comprising a gain value and a compensation value, and the step of generating the adjustment signal comprises:

determining a peak-to-peak level of the tracking error signal by subtracting the bottom data sample from the peak data sample;

determining an offset level of the tracking error signal by averaging the bottom data sample and the peak data sample;

generating the gain value indicating a ratio of a target peak-to-peak level and the peak-to-peak level; and generating the compensation value indicating a difference of a target offset level and the offset level.

12. An adjustment apparatus for adjusting a tracking error signal of an optical disk drive, comprising:

a signal generator for generating a pickup head control signal;

a pickup head driven by the pickup head control signal so as to cross tracks of an optical disk and generating the tracking error signal during a calibration process, wherein the calibration process is performed prior to using the tracking error signal for controlling motion of the pickup head to a specified target position;

a sampling module for sampling the tracking error signal and determining a characteristic value of the tracking error signal;

a comparator for generating an adjustment signal according to the characteristic value and a target value;

a calibration module, adjusting the tracking error signal according to the adjustment signal to obtain an adjusted tracking error signal; and a compensator, generating a tracking control signal according to the adjusted tracking error signal to control the pickup head.

13. The adjustment apparatus as claimed in claim 12, wherein the signal generator generates the pickup head control signal to periodically move the pickup head back and forth parallel to the surface of the optical disk.

14. The adjustment apparatus as claimed in claim 12, wherein the sampling module further determines a run-out amount of the optical disk drive according to the tracking error signal.

15. The adjustment apparatus as claimed in claim 14, wherein the signal generator generates the pickup head control signal according to the run-out amount.

16. The adjustment apparatus as claimed in claim 14, wherein the pickup head control signal drives the actuator with a driving force in inverse proportion to the run-out amount.

17. The adjustment apparatus as claimed in claim 12, wherein the pickup head control signal is a periodic square wave or a periodic sinusoidal wave.

18. The adjustment apparatus as claimed in claim 12, wherein the signal generator is a band pass filter filtering an adjusted tracking error signal to generate the pickup head control signal.

19. The adjustment apparatus as claimed in claim 12, wherein the sampling module further determines a run-out amount of the optical disk drive, and the signal generator is a band pass filter filtering an adjusted tracking error signal to generate the pickup head control signal; wherein gain of the band pass filter is determined according to the run-out amount.

\* \* \* \* \*